US012703950B1

(12) United States Patent
Aldahir et al.

(10) Patent No.: US 12,703,950 B1
(45) Date of Patent: Aug. 11, 2026

(54) COMPOSITION OF RECLAIMED SYNTHETIC TURF AND PRODUCTS COMPRISING SAME

(71) Applicant: Columbia Insurance Company, Omaha, NE (US)

(72) Inventors: Philipe Aldahir, Chattanooga, TN (US); Stephen F. Snow, Ringgold, GA (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 17/389,438

(22) Filed: Jul. 30, 2021

Related U.S. Application Data

(60) Provisional application No. 63/058,797, filed on Jul. 30, 2020.

(51) Int. Cl.
*E01C 13/08* (2006.01)
*C08L 23/08* (2025.01)
*C08L 23/14* (2006.01)
*D01F 6/30* (2006.01)
*D01F 6/46* (2006.01)

(52) U.S. Cl.
CPC .............. *E01C 13/08* (2013.01); *C08L 23/08* (2013.01); *C08L 23/14* (2013.01); *D01F 6/30* (2013.01); *D01F 6/46* (2013.01); *C08J 2323/16* (2013.01); *D10B 2321/021* (2013.01); *D10B 2321/022* (2013.01); *D10B 2505/202* (2013.01); *Y10T 428/23921* (2015.04); *Y10T 428/2982* (2015.01)

(58) Field of Classification Search
CPC . C08L 23/08; C08L 23/14; D01F 6/46; D10B 2321/021; D10B 2321/022; D10B 2505/202; E01C 13/08; Y10T 428/23921; Y10T 428/2982
USPC ........................................................ 428/7, 87
See application file for complete search history.

(56) References Cited

U.S. PATENT DOCUMENTS 9,011,740 B2 4/2015 Mashburn et al.
9,540,777 B1 * 1/2017 Tetrault .............. B01J 20/28016
2001/0046589 A1 * 11/2001 Stroppiana .............. E01C 13/08 428/150
2005/0003193 A1 * 1/2005 Stroppiana .......... B29B 17/0042 428/407
2006/0045995 A1 * 3/2006 Dipple .................... E01C 13/02 428/17
2009/0286017 A1 * 11/2009 Horio ...................... E01C 13/08 428/17
2010/0151158 A1 * 6/2010 Mashburn ............... C08L 23/12 428/17
2012/0315816 A1 * 12/2012 Fowler .................... B32B 5/022 264/129
2013/0022763 A1 * 1/2013 McSwain ................ E01C 13/08 428/17
2013/0064996 A1 * 3/2013 Mashburn ................. B29B 9/06 428/17
2014/0265011 A1 * 9/2014 Mashburn ............... E01C 13/08 241/3
2015/0108041 A1 * 4/2015 Andersen ................ E01C 13/08 209/3.1
2015/0224675 A1 * 8/2015 Mashburn ................. B29B 9/02 524/427
2015/0298357 A1 * 10/2015 Mashburn ................. B29B 9/06 428/17
2018/0117647 A9 * 5/2018 Mashburn ............... B29B 17/02
2018/0179711 A1 * 6/2018 Wu ......................... E01C 13/08
2019/0153679 A1 * 5/2019 Neuhoff ............... D05C 17/026
2019/0301107 A1 * 10/2019 Aldahir .................. D04H 1/541
2020/0071886 A1 * 3/2020 Aldahir .................. D04H 11/08
2020/0102707 A1 * 4/2020 Keyser .................... E01C 13/08
2020/0131718 A1 * 4/2020 Aldahir ................... E01C 13/08
2021/0301475 A1 * 9/2021 Noordegraaf .......... C08J 9/0061
2023/0211524 A1 * 7/2023 Sick .................. E04F 15/02022 241/3

FOREIGN PATENT DOCUMENTS

EP 3838990 A1 * 6/2021 ............... B09B 3/00
WO WO-2020120800 A1 * 6/2020 ............. E01C 13/08

OTHER PUBLICATIONS

Product specification for 70t® Synthetic Turf, “70t® Synthetic Turf Materials Specification | ArtificialTurfSupply.com (archive.org)”, http://web.archive.org/web/20180708110456/http:/www.artificialturfsupply.com/70t-artificial-grass.html, Jul. 8, 2018.*
Product specification for SportPRO-40mf® Synthetic Turf, “SportPRO-40mf® Synthetic Turf Materials Specification (archive.org)”, http://web.archive.org/web/20180128094055/https:/www.artificialturfsupply.com/sportpro40mf.html, Jan. 28, 2018.*
Ahrar, Sheena. “Crumb Rubber Use in Artificial Athletic Turf.” Spring 2017 (Year: 2017).*

* cited by examiner

*Primary Examiner* — Jenna N Chandhok
(74) *Attorney, Agent, or Firm* — Ballard Spahr LLP

(57) ABSTRACT

Described is a composition derived from a portion of reclaimed synthetic turf that contains one or more performance infill materials, one or more polymers, and one or more combusted materials. The composition is suitable to be used as an infill in a synthetic turf.

16 Claims, No Drawings

COMPOSITION OF RECLAIMED SYNTHETIC TURF AND PRODUCTS COMPRISING SAME

CROSS-REFERENCE TO RELATED APPLICATIONS

This application claims priority to and the benefit of the filing date of U.S. Provisional Patent Application No. 63/058,797, filed Jul. 30, 2020, the entirety of which is hereby incorporated by reference herein in its entirety for all purposes.

FIELD

The present invention relates generally to a portion of reclaimed synthetic turf material that can be reused in various applications, including being an infill material or a part of an infill material in synthetic turf.

BACKGROUND

Synthetic turf (also known as artificial turf) has been used for years in athletic playing surfaces such as football, baseball, and soccer fields, and has more recently been used in other applications where an alternative to natural grass is desired. These applications include at least playgrounds, residential and commercial lawns and other landscaping, jogging paths, paintball fields, tennis courts, putting greens, and dog runs. Typically, synthetic turf includes a pile fabric having a backing and a plurality of upstanding ribbons, also called face fibers or filiform formations, resembling grass. Many synthetic turf products also include an infill material dispersed among the upstanding ribbons, which may consist of sand, crumb rubber, thermoplastic elastomer, thermoplastic polyurethane, and ethylene propylene diene monomer rubber, coconut husk, coconut fiber, walnut shell, cork, or other particulates, either singularly or in combination with each other. The infill material simulates the soil in natural turf, acts as a ballast, and/or contributes to the physical properties of the turf, such as resiliency and to assist with having the turf fibers standing upright, that make the turf suitable for a particular use.

Synthetic turf has a limited useful life, the length of which depends on the construction of the turf, the application for which it is used, and how the turf is maintained. As an example, a typical synthetic turf for use as an athletic field may have a useful life of from about 8 to 15 years. A large amount of synthetic turf is currently being used in thousands of athletic fields and in other applications. To avoid sending that turf to landfills at the end of its useful life, there is a need to reuse all or portions of the synthetic turf. A portion of reclaimed synthetic turf as a new composition is disclosed herein.

SUMMARY

The present invention provides a composition which is a portion of reclaimed synthetic turf. The disclosed composition comprises one or more performance infill materials, one or more polymers, and one or more combusted materials. For example, the composition can comprise: a) from about 50 wt % to about 95 wt % of one or more performance infill materials; b) from about 3 wt % to about 25 wt % of one or more polymers; and c) from about 2 wt % to about 25 wt % of one or more combusted materials. The composition can be useful as an infill material itself, or as a component in an infill material used in synthetic turfs. Also disclosed in an synthetic turf comprising the composition disclosed herein.

Additional embodiments of the invention will be set forth, in part, in the detailed description, figures, and claims which follow, and in part will be derived from the detailed description, or can be learned by practice of the invention. It is to be understood that both the foregoing general description and the following detailed description are exemplary and explanatory only and are not restrictive of the invention as disclosed.

DETAILED DESCRIPTION

The present invention can be understood more readily by reference to the following detailed description, examples, drawings, and claims, and their previous and following description. However, before the present articles, systems, and/or methods are disclosed and described, it is to be understood that this invention is not limited to the specific or exemplary embodiments of articles, systems, and/or methods disclosed unless otherwise specified, as such can, of course, vary. It is also to be understood that the terminology used herein is for the purpose of describing particular embodiments only and is not intended to be limiting.

The following description of the invention is provided as an enabling teaching of the invention in its best, currently known embodiment. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those of ordinary skill in the pertinent art will recognize that many modifications and adaptations to the present invention are possible and may even be desirable in certain circumstances and are a part of the present invention. Thus, the following description is again provided as illustrative of the principles of the present invention and not in limitation thereof.

As used herein, the singular forms "a," "an" and "the" include plural referents unless the context clearly dictates otherwise. Thus, for example, reference to a "reclaimed carpet material" includes embodiments having two or more such reclaimed carpet materials unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It should be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

A weight percent of a component, unless specifically stated to the contrary, is based on the total weight of the formulation or composition in which the component is included.

As used herein the term "synthetic turf" includes any form of artificial grass or turf conventionally used, for example, in athletic playing surfaces such as football, baseball, and soccer fields, and in other applications where an alternative to natural grass is desired. These applications include at least playgrounds, residential and commercial lawns and other landscaping, jogging paths, paintball fields, tennis courts, putting greens, dog runs, landfill covers, medians and other areas near roadways, and airport grounds near runways.

As described in detail in U.S. Pat. No. 9,011,740, the entire disclosure of which is incorporated herein by reference, conventional synthetic turf typically includes a pile fabric having a backing and a plurality of upstanding ribbons, also called face fibers or filiform formations, resembling blades of grass. Typically, the upstanding ribbons are made of polyethylene, polypropylene or a blend thereof. The ribbons may also be made of nylon or any other material known in the art alone or in combination with polypropylene and/or polyethylene. These face fibers are tufted or sewn into a primary backing material which can be made of a number of different materials including, but not limited to, polypropylene and polyester. An adhesive coating material, or precoat, is commonly applied to the fiber and primary backing to hold the face fibers in place. In some embodiments, the primary coating of synthetic turfs includes polyurethane and also typically includes a filler such as calcium carbonate or coal fly ash. The primary coatings may also include latex, hot melt adhesives, and/or thermoplastics in addition to or instead of polyurethane. Synthetic turfs may also have a secondary coating which may be similar to the primary coating described herein. Synthetic turfs may also have a secondary backing which can be made of a number of different materials including, but not limited to, polypropylene and polyester.

The face fibers typically make up from about 20 wt % to about 50 wt % of a synthetic turf. The primary backing typically makes up from about 2 wt % to about 10 wt % of a synthetic turf. The primary coating and adhesives typically makes up from about 5 wt % to about 20 wt % of a synthetic turf. The infill material typically make up from about 40 wt % to about 70 wt % of a synthetic turf.

The face fibers may include any material that is conventionally used in carpet manufacture, singly or in combination with other such materials. For example, the face fibers can be synthetic, such as, for example a material comprising one or more of a conventional nylon, polyester, polypropylene (PP), polyethylene (PE), polyurethane (PU), polyvinyl chloride (PVC), polyethylene terephthalate (PET), polytrimethylene terephthalate (PTT), latex, styrene butadiene rubber, or any combination thereof. It is contemplated that the conventional nylon of the face fibers can be, for example and without limitation, nylon 6/6, nylon 6, nylon 10, nylon 10/10, nylon 10/11, nylon 11, and the like. Additionally, the face fibers can comprise natural fibers, such as cotton, wool, or jute. In exemplary embodiments, the face fibers can comprise one or more biodegradable materials, including, for example and without limitation, polylactic acid (PLA).

In exemplary embodiments, the face fibers may include from about 0 wt % to about 100 wt % polyethylene, from about 0 wt % to about 100 wt % polypropylene, and from about 0 wt % to about 100 wt % nylon. In some embodiments, the face fibers include blends of polypropylene (PP) and polyethylene (PE) in any of the following ratios of PP:PE—5:95; 10:90; 50:50; 90:10; 95:5 or any ratio that is within these ranges of ratios. In some embodiments, the face fibers include blends of PP and nylon in any of the following ratios of PP:nylon—5:95; 10:90; 50:50; 90:10; 95:5 or any ratio that is within these ranges of ratios. In some embodiments, the face fibers include blends of PE and nylon in any of the following ratios of PE:nylon—5:95; 10:90; 50:50; 90:10; 95:5 or any ratio that is within these ranges of ratios. In some embodiments, the face fibers include blends of PP, PE, and nylon in any of the following ratios of PP:PE:nylon—10:10:80; 10:80:10; 80:10:10; 33:33:33 or any ratio that is within these ranges of ratios.

The primary backing may include any material that is conventionally used in carpet manufacture, singly or in combination with other such materials. For example, the primary backing can be synthetic, such as, for example a material comprising one or more of a conventional nylon, polyester, polypropylene (PP), polyethylene (PE), polyurethane (PU), polyvinyl chloride (PVC), polyethylene terephthalate (PET), polytrimethylene terephthalate (PTT), latex, styrene butadiene rubber, or any combination thereof. It is contemplated that the conventional nylon of the primary backing can be, for example and without limitation, nylon 6/6, nylon 6, nylon 10, nylon 10/10, nylon 10/11, nylon 11, and the like. Additionally, the primary backing can comprise natural fibers, such as cotton, wool, or jute. In exemplary embodiments, the primary backing can comprise one or more biodegradable materials, including, for example and without limitation, polylactic acid (PLA).

In exemplary embodiments, the primary backing may include from about 0 wt % to about 100 wt % polyester or from about 0 wt % to about 100 wt % polypropylene. Thus, in these embodiments, it is contemplated that the primary backing may include at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, or at least 95 wt % of polyester. It is further contemplated that the primary backing may include at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, or at least 95 wt % of polypropylene. In some embodiments, the primary backing includes blends of PP and polyester in any of the following ratios of PP:polyester—5:95; 10:90; 50:50; 90:10; 95:5 or any ratio that is within these ranges of ratios.

The primary coating may include polyurethane, latex, hot melt adhesive, and/or thermoplastics alone or in combination. Suitable hot melt adhesives include, but are not limited to, Reynolds 54-041, Reynolds 54-854, DHM 4124 (The Reynolds Company P.O. Greenville, S.C., DHM Adhesives, Inc. Calhoun, Ga.). Suitable thermoplastics include, but are not limited to polypropylene, polyethylene and polyester. The primary coating may also include a filler such as coal fly ash, calcium carbonate, iron oxide, or barium sulfate, or any other filler known in the art. The primary coating may include from about 0 wt % to about 100 wt % polyurethane, from about 0 wt % to about 100 wt % latex, from about 0 wt % to about 100 wt % hot melt adhesive, and/or from about 0 wt % to about 100 wt % thermoplastic. Thus, the primary coating may include at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, or at least 95 wt % of polyurethane. It is further contemplated that the primary coating may include at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, or at least 95 wt % latex. It is further contemplated that the primary coating may include at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, or at least 95 wt % hot melt adhesive. It is still further contemplated that the primary coating may include at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, or at least 95 wt % thermoplastic. The primary coating may include from about 0 wt % to about 80 wt % filler. Thus, the primary coating may include at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, or at least 75 wt % filler. In some embodiments, the primary coating includes polyurethane, latex, or thermoplastic and from about 20 wt % to about 80 wt % filler, or from about 40 wt % to about 60 wt % filler. In other embodiments, the primary coating includes hot melts and from about 0 wt % to about 50 wt % filler, or from about 1 wt % to about 25 wt % filler.

Synthetic turf may also include an infill material dispersed among the upstanding ribbons, which acts as a ballast and/or contributes to the physical properties of the turf, such as resiliency, that make the turf suitable for a particular use. In one aspect, the infill can be a performance infill material. The performance infill material can comprise one or more resilient infill materials or one or more non-resilient infill materials, or a combination thereof. In one aspect, the one or more resilient infill materials are selected from the group consisting of crumb rubber, thermoplastic elastomer, thermoplastic polyurethane, and ethylene propylene diene monomer rubber, neoprene, or a combination thereof. In another aspect, one or more non-resilient infill materials are selected from the group consisting of coconut husk, coconut fiber, walnut shell, and cork, or a combination thereof.

The composition disclosed herein can be derived from a reclaiming process of used synthetic turfs. Synthetic turfs can be reclaimed by co-processing all component of the synthetic turf to produce a first portion and a second portion of reclaimed synthetic turf. The first portion contains components that can be further recycled to produce new products. The second portion is not suitable to be recycled further. The second portion, as is, corresponds to the composition disclosed herein. The disclosed composition contains a unique mixture of components derived from the second portion of reclaimed synthetic turf.

The composition disclosed herein can be used alone as an infill material alone, or be used alone as an infill material when combined with one or more other infill materials.

Disclosed herein is a composition comprising: a) from about 50 wt % to about 95 wt % of one or more performance infill materials; b) from about 3 wt % to about 25 wt % of one or more polymers; and c) from about 2 wt % to about 25 wt % of one or more combusted materials.

In one aspect, the composition can comprise from about 55 wt % to about 95 wt % of the one or more performance infill materials. For example, the composition can comprise from about 60 wt % to about 95 wt % of the one or more performance infill materials. In another example, the composition can comprise from about 65 wt % to about 95 wt % of the one or more performance infill materials. In yet another example, the composition can comprise from about 70 wt % to about 95 wt % of the one or more performance infill materials. In yet another example, the composition can comprise from about 75 wt % to about 95 wt % of the one or more performance infill materials. In yet another example, the composition can comprise from about 80 wt % to about 95 wt % of the one or more performance infill materials. In yet another example, the composition can comprise from about 85 wt % to about 95 wt % of the one or more performance infill materials. In yet another example, the composition can comprise from about 90 wt % to about 95 wt % of the one or more performance infill materials. In yet another example, the composition can comprise from about 50 wt % to about 90 wt % of the one or more performance infill materials. In yet another example, the composition can comprise from about 50 wt % to about 85 wt % of the one or more performance infill materials. In yet another example, the composition can comprise from about 50 wt % to about 80 wt % of the one or more performance infill materials. In yet another example, the composition can comprise from about 50 wt % to about 75 wt % of the one or more performance infill materials. In yet another example, the composition can comprise from about 50 wt % to about 70 wt % of the one or more performance infill materials. In yet another example, the composition can comprise from about 50 wt % to about 65 wt % of the one or more performance infill materials. In yet another example, the composition can comprise from about 50 wt % to about 60 wt % of the one or more performance infill materials. In yet another example, the composition can comprise from about 70 wt % to about 90 wt % of the one or more performance infill materials. In yet another example, the composition can comprise from about 80 wt % to about 90 wt % of the one or more performance infill materials.

In one aspect, the one or more performance infill materials can comprise one or more resilient infill materials or one or more non-resilient infill materials, or a combination thereof. For example, the one or more performance infill materials can comprise one or more resilient infill materials. In another example, the one or more performance infill materials can consist of one or more resilient infill materials infill materials. In yet another example, the one or more performance infill materials can comprise one or more non-resilient infill materials infill materials. In yet another example, the one or more performance infill materials can consist of one or more non-resilient infill materials infill materials.

In one aspect, the one or more resilient infill materials can be selected from the group consisting of crumb rubber, thermoplastic elastomer, thermoplastic polyurethane, neoprene, and ethylene propylene diene monomer rubber, or a combination thereof. For example, the one or more resilient infill materials can comprise crumb rubber. In another example, the one or more resilient infill materials can comprise thermoplastic elastomer. In yet another, the one or more resilient infill materials can comprise thermoplastic polyurethane. In yet another example, the one or more resilient infill materials can comprise neoprene. In yet example, the one or more resilient infill materials can comprise ethylene propylene diene monomer rubber.

In one aspect, the one or more non-resilient infill materials can be selected from the group consisting of coconut husk, coconut fiber, walnut shell, and cork, or a combination thereof. For example, the one or more non-resilient infill materials can comprise coconut husk. In another example, the one or more non-resilient infill materials can comprise coconut fiber. I yet another example, the one or more non-resilient infill materials can comprise walnut shell. I yet another example, the one or more non-resilient infill materials can comprise cork.

In one aspect, the composition can comprise from about 5 wt % to about 25 wt % of the one or more polymers. For example, the composition can comprise from about 10 wt % to about 25 wt % of the one or more polymers. In another example, the composition can comprise from about 15 wt % to about 25 wt % of the one or more polymers. In yet another example, the composition can comprise from about 20 wt % to about 25 wt % of the one or more polymers. In yet another example, the composition can comprise from about 3 wt % to about 20 wt % of the one or more polymers. In yet another example, the composition can comprise from about 3 wt % to about 15 wt % of the one or more polymers. In yet another example, the composition can comprise from about 3 wt % to about 10 wt % of the one or more polymers. In yet another example, the composition can comprise from about 3 wt % to about 7 wt % of the one or more polymers. In yet another example, the composition can comprise from about 5 wt % to about 20 wt % of the one or more polymers. In yet another example, the composition can comprise from about 10 wt % to about 20 wt % of the one or more polymers. In yet another example, the composition can comprise from about 5 wt % to about 10 wt % of the one or more polymers. In yet another example, the composition can comprise from about 5 wt % to about 15 wt % of the one or more polymers.

In one aspect, the one or more polymers comprises one or more polyolefins. In one aspect, the one or more polyolefins comprises polyethylene and polypropylene. In one aspect, the one or more polyolefins comprises polyethylene. In one aspect, the one or more polyolefins comprises polypropylene. For example, the composition comprises from about 3 wt % to about 14.9 wt % of polyethylene and from about 0.1 wt % to about 5 wt % of polypropylene. In another example, the composition comprises from about 3 wt % to about 12 wt % of polyethylene and from about 0.1 wt % to about 5 wt % of polypropylene. In yet another example, the composition comprises from about 3 wt % to about 10 wt % of polyethylene and from about 0.1 wt % to about 5 wt % of polypropylene. In yet another example, the composition comprises from about 5 wt % to about 10 wt % of polyethylene and from about 0.1 wt % to about 5 wt % of polypropylene. In yet another aspect, the composition comprises from about 3 wt % to about 14.9 wt % of polyethylene and from about 0.5 wt % to about 5 wt % of polypropylene. In yet another aspect, the composition comprises from about 3 wt % to about 14.9 wt % of polyethylene and from about 1 wt % to about 5 wt % of polypropylene. In yet another aspect, the composition comprises from about 3 wt % to about 14.9 wt % of polyethylene and from about 2 wt % to about 5 wt % of polypropylene. In yet another aspect, the composition comprises from about 3 wt % to about 14.9 wt % of polyethylene and from about 3 wt % to about 5 wt % of polypropylene. In yet another aspect, the composition comprises from about 3 wt % to about 14.9 wt % of polyethylene and from about 0.1 wt % to about 4 wt % of polypropylene. In yet another aspect, the composition comprises from about 3 wt % to about 14.9 wt % of polyethylene and from about 0.1 wt % to about 3 wt % of polypropylene. In yet another aspect, the composition comprises from about 3 wt % to about 14.9 wt % of polyethylene and from about 0.1 wt % to about 2 wt % of polypropylene. In yet another aspect, the composition comprises from about 3 wt % to about 10 wt % of polyethylene and from about 0.5 wt % to about 5 wt % of polypropylene. In yet another aspect, the composition comprises from about 5 wt % to about 10 wt % of polyethylene and from about 0.5 wt % to about 1.5 wt % of polypropylene.

In one aspect, the one or more polymers can comprise one or more polyolefins, one or more polyesters, or one or more polyamides, or a combination thereof. For example, the one or more polymers can comprise one or more polyesters. In another aspect, the one or more polymers can comprise one or more polyamides.

In one aspect, the one or more polymers can comprise the one or more polyesters, wherein the one or more polyesters comprises polyethylene terephthalate.

In one aspect, the one or more polymers can comprise the one or more polyamides, wherein the one or more polyamides comprises polyamide 6, polyamide 11, polyamide 12, or copolymers, or a blend thereof. For example, he one or more polymers can comprise the one or more polyamides, wherein the one or more polyamides comprises polyamide 6.

In one aspect, the composition can comprise from about 5 wt % to about 25 wt % of the one or more combusted materials. For example, the composition can comprise from about 10 wt % to about 25 wt % of the one or more combusted materials s. In another example, the composition can comprise from about 15 wt % to about 25 wt % of the one or more combusted materials. In yet another example, the composition can comprise from about 20 wt % to about 25 wt % of the one or more combusted materials. In yet another example, the composition can comprise from about 3 wt % to about 20 wt % of the one or more combusted materials. In yet another example, the composition can comprise from about 3 wt % to about 15 wt % of the one or more combusted materials. In yet another example, the composition can comprise from about 3 wt % to about 10 wt % of the one or more combusted materials. In yet another example, the composition can comprise from about 3 wt % to about 7 wt % of the one or more combusted materials. In yet another example, the composition can comprise from about 5 wt % to about 20 wt % of the one or more combusted materials. In yet another example, the composition can comprise from about 10 wt % to about 20 wt % of the one or more combusted materials. In yet another example, the composition can comprise from about 5 wt % to about 10 wt % of the one or more combusted materials. In yet another example, the composition can comprise from about 5 wt % to about 15 wt % of the one or more combusted materials.

In one aspect, the one or more combustible materials can comprise ash. In another aspect, the one or more combustible materials can comprise a petroleum based material. In another aspect, the one or more combustible materials can comprise a combusted plastic material.

In one aspect, the composition can comprise: a) from about 70 wt % to about 90 wt % of one or more performance infill materials; b) from about 5 wt % to about 15 wt % of one or more polymers; and c) from about 5 wt % to about 15 wt % of one or more combusted materials. For example, the composition can comprise: a) from about 80 wt % to about 90 wt % of one or more performance infill materials; b) from about 5 wt % to about 15 wt % of one or more polymers; and c) from about 5 wt % to about 15 wt % of one or more combusted materials. In another example, the composition can comprise: a) from about 70 wt % to about 90 wt % of one or more performance infill materials; b) from about 5 wt % to about 10 wt % of one or more polymers; and c) from about 5 wt % to about 15 wt % of one or more combusted materials. In another example, the composition can comprise: a) from about 70 wt % to about 90 wt % of one or more performance infill materials; b) from about 5 wt % to about 15 wt % of one or more polymers; and c) from about 5 wt % to about 10 wt % of one or more combusted materials. In yet another example, the composition can comprise: a) from about 80 wt % to about 90 wt % of one or more performance infill materials; b) from about 5 wt % to about 10 wt % of one or more polymers; and c) from about 5 wt % to about 10 wt % of one or more combusted materials.

In one aspect, the composition can comprise: a) from about 70 wt % to about 90 wt % of crumb rubber; b) from about 5 wt % to about 10 wt % of polyethylene, from about 0.5 wt % to about 1.5 wt % of polypropylene; and c) from about 5 wt % to about 15 wt % of ash. For example, the composition can comprise: a) from about 70 wt % to about 90 wt % of crumb rubber; b) from about 5 wt % to about 10 wt % of polyethylene, from about 0.5 wt % to about 3 wt % of polypropylene; and c) from about 5 wt % to about 15 wt % of ash. In another example, the composition can comprise: a) from about 80 wt % to about 90 wt % of crumb rubber; b) from about 5 wt % to about 10 wt % of polyethylene, from about 0.5 wt % to about 1.5 wt % of polypropylene; and c) from about 5 wt % to about 10 wt % of ash.

In one aspect, the composition is a homogeneous composition. In another aspect, the composition is a heterogeneous composition.

In one aspect, the composition can be a particle having a size from 10 mesh to 30 mesh. For example, the composition can be a particle having a size from 15 mesh to 30 mesh. In another example, the composition can be a particle having a size from 20 mesh to 30 mesh. In yet another example, the composition can be a particle having a size from 10 mesh to 25 mesh. In another example, the composition can be a particle having a size from 10 mesh to 20 mesh.

In one aspect, the composition can have a density from 0.1 $g/cm^3$ to 0.9 $g/cm^3$. For example, the composition can have a density from 0.3 $g/cm^3$ to 0.9 $g/cm^3$. In another example, the composition can have a density from 0.1 $g/cm^3$ to 0.6 $g/cm^3$. In yet another example, the composition can have a density from 0.1 $g/cm^3$ to 0.3 $g/cm^3$.

Also disclosed herein is a composition suitable to be used as an infill material. In one aspect, the composition suitable to be used as an infill material can consist of the composition comprising: a) from about 50 wt % to about 95 wt % of one or more performance infill materials; b) from about 3 wt % to about 25 wt % of one or more polymers; and c) from about 2 wt % to about 25 wt % of one or more combusted materials. In one aspect, the composition suitable to be used as an infill material can comprise the composition comprising: a) from about 50 wt % to about 95 wt % of one or more performance infill materials; b) from about 3 wt % to about 25 wt % of one or more polymers; and c) from about 2 wt % to about 25 wt % of one or more combusted materials, and one or more performance infill materials.

In one aspect, disclosed herein is a composition suitable to be used as an infill material can comprise a) about more than 0 wt % to 100 wt % of the composition disclosed herein; and b) about less than 100 wt % to 0 wt % of one or more performance infill materials. For example, the composition suitable to be used as an infill material can comprise a) from about 5 wt % to 100 wt % of the composition disclosed herein; and b) from about 95 wt % to 0 wt % of one or more performance infill materials. In another example, the composition suitable to be used as an infill material can comprise a) from about 10 wt % to 100 wt % of the composition disclosed herein; and b) from about 90 wt % to 0 wt % of one or more performance infill materials. In yet another example, the composition suitable to be used as an infill material can comprise a) from about 15 wt % to 100 wt % of the composition disclosed herein; and b) from about 85 wt % to 0 wt % of one or more performance infill materials. In yet another example, the composition suitable to be used as an infill material can comprise a) from about 20 wt % to 100 wt % of the composition disclosed herein; and b) from about 80 wt % to 0 wt % of one or more performance infill materials. In yet another example, the composition suitable to be used as an infill material can comprise a) from about 25 wt % to 100 wt % of the composition disclosed herein; and b) from about 75 wt % to 0 wt % of one or more performance infill materials. In yet another example, the composition suitable to be used as an infill material can comprise a) from about 30 wt % to 100 wt % of the composition disclosed herein; and b) from about 70 wt % to 0 wt % of one or more performance infill materials. In yet another example, the composition suitable to be used as an infill material can comprise a) from about 35 wt % to 100 wt % of the composition disclosed herein; and b) from about 65 wt % to 0 wt % of one or more performance infill materials. In yet another example, the composition suitable to be used as an infill material can comprise a) from about 40 wt % to 100 wt % of the composition disclosed herein; and b) from about 60 wt % to 0 wt % of one or more performance infill materials. In yet another example, the composition suitable to be used as an infill material can comprise a) from about 50 wt % to 100 wt % of the composition disclosed herein; and b) from about 50 wt % to 0 wt % of one or more performance infill materials. In yet another example, the composition suitable to be used as an infill material can comprise a) from about 55 wt % to 100 wt % of the composition disclosed herein; and b) from about 45 wt % to 0 wt % of one or more performance infill materials. In yet another example, the composition suitable to be used as an infill material can comprise a) from about 60 wt % to 100 wt % of the composition disclosed herein; and b) from about 40 wt % to 0 wt % of one or more performance infill materials. In yet another example, the composition suitable to be used as an infill material can comprise a) from about 65 wt % to 100 wt % of the composition disclosed herein; and b) from about 35 wt % to 0 wt % of one or more performance infill materials. In yet another example, the composition suitable to be used as an infill material can comprise a) from about 70 wt % to 100 wt % of the composition disclosed herein; and b) from about 30 wt % to 0 wt % of one or more performance infill materials. In yet another example, the composition suitable to be used as an infill material can comprise a) from about 75 wt % to 100 wt % of the composition disclosed herein; and b) from about 25 wt % to 0 wt % of one or more performance infill materials. In yet another example, the composition suitable to be used as an infill material can comprise a) from about 80 wt % to 100 wt % of the composition disclosed herein; and b) from about 20 wt % to 0 wt % of one or more performance infill materials. In yet another example, the composition suitable to be used as an infill material can comprise a) from about 85 wt % to 100 wt % of the composition disclosed herein; and b) from about 15 wt % to 0 wt % of one or more performance infill materials. In yet another example, the composition suitable to be used as an infill material can comprise a) from about 90 wt % to 100 wt % of the composition disclosed herein; and b) from about 10 wt % to 0 wt % of one or more performance infill materials. In yet another example, the composition suitable to be used as an infill material can comprise a) from about 95 wt % to 100 wt % of the composition disclosed herein; and b) from about 5 wt % to 0 wt % of one or more performance infill materials. In yet another example, the composition suitable to be used as an infill material can comprise a) from about more than 0 wt % to about 95 wt % of the composition disclosed herein; and b) from about less than 100 wt % to 5 wt % of one or more performance infill materials. In yet another example, the composition suitable to be used as an infill material can comprise a) from about more than 0 wt % to about 90 wt % of the composition disclosed herein; and b) from about less than 100 wt % to 10 wt % of one or more performance infill materials. In yet another example, the composition suitable to be used as an infill material can comprise a) from about more than 0 wt % to about 85 wt % of the composition disclosed herein; and b) from about less than 100 wt % to 15 wt % of one or more performance infill materials. In yet another example, the composition suitable to be used as an infill material can comprise a) from about more than 0 wt % to about 80 wt % of the composition disclosed herein; and b) from about less than 100 wt % to 20 wt % of one or more performance infill materials. In yet another example, the composition suitable to be used as an infill material can comprise a) from about more than 0 wt % to about 75 wt % of the composition disclosed herein; and b) from about less than 100 wt % to 25 wt % of one or more performance infill materials. In yet another example, the composition suitable to be used as an infill material can comprise a) from about more than 0 wt % to about 70 wt % of the composition disclosed herein; and b) from about less than 100 wt % to 30 wt % of one or more performance infill materials. In yet another example, the composition suitable to be used as an infill material can comprise a) from about more than 0 wt % to about 65 wt % of the composition disclosed herein; and b) from about less than 100 wt % to 35 wt % of one or more performance infill materials. In yet another example, the composition suitable to be used as an infill material can comprise a) from about more than 0 wt % to about 60 wt % of the composition disclosed herein; and b) from about less than 100 wt % to 40 wt % of one or more performance infill materials. In yet another example, the composition suitable to be used as an infill material can comprise a) from about more than 0 wt % to about 55 wt % of the composition disclosed herein; and b) from about less than 100 wt % to 45 wt % of one or more performance infill materials. In yet another example, the composition suitable to be used as an infill material can comprise a) from about more than 0 wt % to about 50 wt % of the composition disclosed herein; and b) from about less than 100 wt % to 50 wt % of one or more performance infill materials. In yet another example, the composition suitable to be used as an infill material can comprise a) from about more than 0 wt % to about 45 wt % of the composition disclosed herein; and b) from about less than 100 wt % to 55 wt % of one or more performance infill materials. In yet another example, the composition suitable to be used as an infill material can comprise a) from about more than 0 wt % to about 40 wt % of the composition disclosed herein; and b) from about less than 100 wt % to 60 wt % of one or more performance infill materials. In yet another example, the composition suitable to be used as an infill material can comprise a) from about more than 0 wt % to about 35 wt % of the composition disclosed herein; and b) from about less than 100 wt % to 65 wt % of one or more performance infill materials. In yet another example, the composition suitable to be used as an infill material can comprise a) from about more than 0 wt % to about 30 wt % of the composition disclosed herein; and b) from about less than 100 wt % to 70 wt % of one or more performance infill materials. In yet another example, the composition suitable to be used as an infill material can comprise a) from about more than 0 wt % to about 25 wt % of the composition disclosed herein; and b) from about less than 100 wt % to 75 wt % of one or more performance infill materials. In yet another example, the composition suitable to be used as an infill material can comprise a) from about more than 0 wt % to about 20 wt % of the composition disclosed herein; and b) from about less than 100 wt % to 80 wt % of one or more performance infill materials. In yet another example, the composition suitable to be used as an infill material can comprise a) from about more than 0 wt % to about 15 wt % of the composition disclosed herein; and b) from about less than 100 wt % to 85 wt % of one or more performance infill materials. In yet another example, the composition suitable to be used as an infill material can comprise a) from about more than 0 wt % to about 10 wt % of the composition disclosed herein; and b) from about less than 100 wt % to 90 wt % of one or more performance infill materials. In yet another example, the composition suitable to be used as an infill material can comprise a) from about more than 0 wt % to about 5 wt % of the composition disclosed herein; and b) from about less than 100 wt % to 95 wt % of one or more performance infill materials. In yet another example, the composition suitable to be used as an infill material can comprise a) from about 5 wt % to about 95 wt % of the composition disclosed herein; and b) from about 95 wt % to 5 wt % of one or more performance infill materials. In yet another example, the composition suitable to be used as an infill material can comprise a) from about 10 wt % to about 90 wt % of the composition disclosed herein; and b) from about 90 wt % to 10 wt % of one or more performance infill materials. In yet another example, the composition suitable to be used as an infill material can comprise a) from about 15 wt % to about 85 wt % of the composition disclosed herein; and b) from about 85 wt % to 15 wt % of one or more performance infill materials. In yet another example, the composition suitable to be used as an infill material can comprise a) from about 20 wt % to about 80 wt % of the composition disclosed herein; and b) from about 80 wt % to 20 wt % of one or more performance infill materials. In yet another example, the composition suitable to be used as an infill material can comprise a) from about 30 wt % to about 70 wt % of the composition disclosed herein; and b) from about 70 wt % to 30 wt % of one or more performance infill materials. In yet another example, the composition suitable to be used as an infill material can comprise a) from about 40 wt % to about 60 wt % of the composition disclosed herein; and b) from about 60 wt % to 40 wt % of one or more performance infill materials. In yet another example, the composition suitable to be used as an infill material can comprise a) from about 45 wt % to about 55 wt % of the composition disclosed herein; and b) from about 55 wt % to 45 wt % of one or more performance infill materials.

In one aspect, the one or more performance infill materials can comprise one or more resilient infill materials or one or more non-resilient infill materials, or a combination thereof. For example, the one or more performance infill materials can comprise one or more resilient infill materials. In another example, the one or more performance infill materials can consist of one or more resilient infill materials infill materials. In yet another example, the one or more performance infill materials can comprise one or more non-resilient infill materials infill materials. In yet another example, the one or more performance infill materials can consist of one or more non-resilient infill materials infill materials.

In one aspect, the one or more resilient infill materials can be selected from the group consisting of crumb rubber, thermoplastic elastomer, thermoplastic polyurethane, neoprene, and ethylene propylene diene monomer rubber, or a combination thereof. For example, the one or more resilient infill materials can comprise crumb rubber. In another example, the one or more resilient infill materials can comprise thermoplastic elastomer. In yet another, the one or more resilient infill materials can comprise thermoplastic polyurethane. In yet another example, the one or more resilient infill materials can comprise neoprene. In yet example, the one or more resilient infill materials can comprise ethylene propylene diene monomer rubber.

In one aspect, the one or more non-resilient infill materials can be selected from the group consisting of coconut husk, coconut fiber, walnut shell, and cork, or a combination thereof. For example, the one or more non-resilient infill materials can comprise coconut husk. In another example, the one or more non-resilient infill materials can comprise coconut fiber. I yet another example, the one or more non-resilient infill materials can comprise walnut shell. For example, the one or more non-resilient infill materials can comprise cork.

In one aspect, the composition suitable to be used as an infill material can comprise the composition comprising: a) from about 50 wt % to about 95 wt % of one or more performance infill materials; b) from about 3 wt % to about 25 wt % of one or more polymers; and c) from about 2 wt % to about 25 wt % of one or more combusted materials and; one or more polymeric materials or one or more non-polymeric materials, or a combination thereof. For example, the composition suitable to be used as an infill material can comprise the composition comprising: a) from about 50 wt % to about 95 wt % of one or more performance infill materials; b) from about 3 wt % to about 25 wt % of one or more polymers; and c) from about 2 wt % to about 25 wt % of one or more combusted materials and; one or more polymeric materials. Suitable polymeric materials include, but are not limited to, polyolefins, such as polypropylene (PP) and polyethylene (PE). Other suitable polymeric materials include, but are not limited to nylon, polyester, polyurethane (PU), polyvinyl chloride (PVC), polyethylene terephthalate (PET), polytrimethylene terephthalate (PTT), latex, and styrene butadiene. The polymeric material can be leftover material from other processes. As such, the leftover material in those processes can be utilized and not go to waste. For example, the composition suitable to be used as an infill material can comprise the composition comprising: a) from about 50 wt % to about 95 wt % of one or more performance infill materials; b) from about 3 wt % to about 25 wt % of one or more polymers; and c) from about 2 wt % to about 25 wt % of one or more combusted materials and; one or more non-polymeric materials. Suitable non-polymeric materials include natural rubber and cellulosic materials.

In one aspect, disclosed herein is a composition suitable to be used as an infill material can comprise a) about more than 0 wt % to 100 wt % of the composition disclosed herein; and b) about less than 100 wt % to 0 wt % of one or more polymeric materials or one or more non-polymeric materials, or a combination thereof. For example, the composition suitable to be used as an infill material can comprise a) from about 5 wt % to 100 wt % of the composition disclosed herein; and b) from about 95 wt % to 0 wt % of one or more polymeric materials or one or more non-polymeric materials, or a combination thereof. In another example, the composition suitable to be used as an infill material can comprise a) from about 10 wt % to 100 wt % of the composition disclosed herein; and b) from about 90 wt % to 0 wt % of one or more polymeric materials or one or more non-polymeric materials, or a combination thereof. In yet another example, the composition suitable to be used as an infill material can comprise a) from about 15 wt % to 100 wt % of the composition disclosed herein; and b) from about 85 wt % to 0 wt % of one or more polymeric materials or one or more non-polymeric materials, or a combination thereof. In yet another example, the composition suitable to be used as an infill material can comprise a) from about 20 wt % to 100 wt % of the composition disclosed herein; and b) from about 80 wt % to 0 wt % of one or more polymeric materials or one or more non-polymeric materials, or a combination thereof. In yet another example, the composition suitable to be used as an infill material can comprise a) from about 25 wt % to 100 wt % of the composition disclosed herein; and b) from about 75 wt % to 0 wt % of one or more polymeric materials or one or more non-polymeric materials, or a combination thereof. In yet another example, the composition suitable to be used as an infill material can comprise a) from about 30 wt % to 100 wt % of the composition disclosed herein; and b) from about 70 wt % to 0 wt % of one or more polymeric materials or one or more non-polymeric materials, or a combination thereof. In yet another example, the composition suitable to be used as an infill material can comprise a) from about 35 wt % to 100 wt % of the composition disclosed herein; and b) from about 65 wt % to 0 wt % of one or more polymeric materials or one or more non-polymeric materials, or a combination thereof. In yet another example, the composition suitable to be used as an infill material can comprise a) from about 40 wt % to 100 wt % of the composition disclosed herein; and b) from about 60 wt % to 0 wt % of one or more polymeric materials or one or more non-polymeric materials, or a combination thereof. In yet another example, the composition suitable to be used as an infill material can comprise a) from about 50 wt % to 100 wt % of the composition disclosed herein; and b) from about 50 wt % to 0 wt % of one or more polymeric materials or one or more non-polymeric materials, or a combination thereof. In yet another example, the composition suitable to be used as an infill material can comprise a) from about 55 wt % to 100 wt % of the composition disclosed herein; and b) from about 45 wt % to 0 wt % of one or more polymeric materials or one or more non-polymeric materials, or a combination thereof. In yet another example, the composition suitable to be used as an infill material can comprise a) from about 60 wt % to 100 wt % of the composition disclosed herein; and b) from about 40 wt % to 0 wt % of one or more polymeric materials or one or more non-polymeric materials, or a combination thereof. In yet another example, the composition suitable to be used as an infill material can comprise a) from about 65 wt % to 100 wt % of the composition disclosed herein; and b) from about 35 wt % to 0 wt % of one or more polymeric materials or one or more non-polymeric materials, or a combination thereof. In yet another example, the composition suitable to be used as an infill material can comprise a) from about 70 wt % to 100 wt % of the composition disclosed herein; and b) from about 30 wt % to 0 wt % of one or more polymeric materials or one or more non-polymeric materials, or a combination thereof. In yet another example, the composition suitable to be used as an infill material can comprise a) from about 75 wt % to 100 wt % of the composition disclosed herein; and b) from about 25 wt % to 0 wt % of one or more polymeric materials or one or more non-polymeric materials, or a combination thereof. In yet another example, the composition suitable to be used as an infill material can comprise a) from about 80 wt % to 100 wt % of the composition disclosed herein; and b) from about 20 wt % to 0 wt % of one or more polymeric materials or one or more non-polymeric materials, or a combination thereof. In yet another example, the composition suitable to be used as an infill material can comprise a) from about 85 wt % to 100 wt % of the composition disclosed herein; and b) from about 15 wt % to 0 wt % of one or more polymeric materials or one or more non-polymeric materials, or a combination thereof. In yet another example, the composition suitable to be used as an infill material can comprise a) from about 90 wt % to 100 wt % of the composition disclosed herein; and b) from about 10 wt % to 0 wt % of one or more polymeric materials or one or more non-polymeric materials, or a combination thereof. In yet another example, the composition suitable to be used as an infill material can comprise a) from about 95 wt % to 100 wt % of the composition disclosed herein; and b) from about 5 wt % to 0 wt % of one or more polymeric materials or one or more non-polymeric materials, or a combination thereof. In yet another example, the composition suitable to be used as an infill material can comprise a) from about more than 0 wt % to about 95 wt % of the composition disclosed herein; and b) from about less than 100 wt % to 5 wt % of one or more polymeric materials or one or more non-polymeric materials, or a combination thereof. In yet another example, the composition suitable to be used as an infill material can comprise a) from about more than 0 wt % to about 90 wt % of the composition disclosed herein; and b) from about less than 100 wt % to 10 wt % of one or more polymeric materials or one or more non-polymeric materials, or a combination thereof. In yet another example, the composition suitable to be used as an infill material can comprise a) from about more than 0 wt % to about 85 wt % of the composition disclosed herein; and b) from about less than 100 wt % to 15 wt % of one or more polymeric materials or one or more non-polymeric materials, or a combination thereof. In yet another example, the composition suitable to be used as an infill material can comprise a) from about more than 0 wt % to about 80 wt % of the composition disclosed herein; and b) from about less than 100 wt % to 20 wt % of one or more polymeric materials or one or more non-polymeric materials, or a combination thereof. In yet another example, the composition suitable to be used as an infill material can comprise a) from about more than 0 wt % to about 75 wt % of the composition disclosed herein; and b) from about less than 100 wt % to 25 wt % of one or more polymeric materials or one or more non-polymeric materials, or a combination thereof. In yet another example, the composition suitable to be used as an infill material can comprise a) from about more than 0 wt % to about 70 wt % of the composition disclosed herein; and b) from about less than 100 wt % to 30 wt % of one or more polymeric materials or one or more non-polymeric materials, or a combination thereof. In yet another example, the composition suitable to be used as an infill material can comprise a) from about more than 0 wt % to about 65 wt % of the composition disclosed herein; and b) from about less than 100 wt % to 35 wt % of one or more polymeric materials or one or more non-polymeric materials, or a combination thereof. In yet another example, the composition suitable to be used as an infill material can comprise a) from about more than 0 wt % to about 60 wt % of the composition disclosed herein; and b) from about less than 100 wt % to 40 wt % of one or more polymeric materials or one or more non-polymeric materials, or a combination thereof. In yet another example, the composition suitable to be used as an infill material can comprise a) from about more than 0 wt % to about 55 wt % of the composition disclosed herein; and b) from about less than 100 wt % to 45 wt % of one or more polymeric materials or one or more non-polymeric materials, or a combination thereof. In yet another example, the composition suitable to be used as an infill material can comprise a) from about more than 0 wt % to about 50 wt % of the composition disclosed herein; and b) from about less than 100 wt % to 50 wt % of one or more polymeric materials or one or more non-polymeric materials, or a combination thereof. In yet another example, the composition suitable to be used as an infill material can comprise a) from about more than 0 wt % to about 45 wt % of the composition disclosed herein; and b) from about less than 100 wt % to 55 wt % of one or more polymeric materials or one or more non-polymeric materials, or a combination thereof. In yet another example, the composition suitable to be used as an infill material can comprise a) from about more than 0 wt % to about 40 wt % of the composition disclosed herein; and b) from about less than 100 wt % to 60 wt % of one or more polymeric materials or one or more non-polymeric materials, or a combination thereof. In yet another example, the composition suitable to be used as an infill material can comprise a) from about more than 0 wt % to about 35 wt % of the composition disclosed herein; and b) from about less than 100 wt % to 65 wt % of one or more polymeric materials or one or more non-polymeric materials, or a combination thereof. In yet another example, the composition suitable to be used as an infill material can comprise a) from about more than 0 wt % to about 30 wt % of the composition disclosed herein; and b) from about less than 100 wt % to 70 wt % of one or more polymeric materials or one or more non-polymeric materials, or a combination thereof. In yet another example, the composition suitable to be used as an infill material can comprise a) from about more than 0 wt % to about 25 wt % of the composition disclosed herein; and b) from about less than 100 wt % to 75 wt % of one or more polymeric materials or one or more non-polymeric materials, or a combination thereof. In yet another example, the composition suitable to be used as an infill material can comprise a) from about more than 0 wt % to about 20 wt % of the composition disclosed herein; and b) from about less than 100 wt % to 80 wt % of one or more polymeric materials or one or more non-polymeric materials, or a combination thereof. In yet another example, the composition suitable to be used as an infill material can comprise a) from about more than 0 wt % to about 15 wt % of the composition disclosed herein; and b) from about less than 100 wt % to 85 wt % of one or more polymeric materials or one or more non-polymeric materials, or a combination thereof. In yet another example, the composition suitable to be used as an infill material can comprise a) from about more than 0 wt % to about 10 wt % of the composition disclosed herein; and b) from about less than 100 wt % to 90 wt % of one or more polymeric materials or one or more non-polymeric materials, or a combination thereof. In yet another example, the composition suitable to be used as an infill material can comprise a) from about more than 0 wt % to about 5 wt % of the composition disclosed herein; and b) from about less than 100 wt % to 95 wt % of one or more polymeric materials or one or more non-polymeric materials, or a combination thereof. In yet another example, the composition suitable to be used as an infill material can comprise a) from about 5 wt % to about 95 wt % of the composition disclosed herein; and b) from about 95 wt % to 5 wt % of one or more polymeric materials or one or more non-polymeric materials, or a combination thereof. In yet another example, the composition suitable to be used as an infill material can comprise a) from about 10 wt % to about 90 wt % of the composition disclosed herein; and b) from about 90 wt % to 10 wt % of one or more polymeric materials or one or more non-polymeric materials, or a combination thereof. In yet another example, the composition suitable to be used as an infill material can comprise a) from about 15 wt % to about 85 wt % of the composition disclosed herein; and b) from about 85 wt % to 15 wt % of one or more polymeric materials or one or more non-polymeric materials, or a combination thereof. In yet another example, the composition suitable to be used as an infill material can comprise a) from about 20 wt % to about 80 wt % of the composition disclosed herein; and b) from about 80 wt % to 20 wt % of one or more polymeric materials or one or more non-polymeric materials, or a combination thereof. In yet another example, the composition suitable to be used as an infill material can comprise a) from about 30 wt % to about 70 wt % of the composition disclosed herein; and b) from about 70 wt % to 30 wt % of one or more polymeric materials or one or more non-polymeric materials, or a combination thereof. In yet another example, the composition suitable to be used as an infill material can comprise a) from about 40 wt % to about 60 wt % of the composition disclosed herein; and b) from about 60 wt % to 40 wt % of one or more polymeric materials or one or more non-polymeric materials, or a combination thereof. In yet another example, the composition suitable to be used as an infill material can comprise a) from about 45 wt % to about 55 wt % of the composition disclosed herein; and b) from about 55 wt % to 45 wt % of one or more performance infill materials.

Also disclosed herein is a synthetic turf installation comprising a primary backing having a face side and a backside, a plurality of yarns tufted into the primary backing and extending substantially vertically away from the face side thereof and infill disposed between the yarns, wherein the infill comprises the composition suitable to be used as an infill material disclosed herein.

The synthetic turf installation can be a new synthetic turf installation.

The compositions disclosed herein reuse apportion of reclaimed synthetic turf material. By recycling and incorporating the disclosed compositions into h products, several advantages can be realized. For example, these products, such as an infill, incorporating the reclaimed material have less of an environmental footprint relative to traditional materials, comprising only virgin materials. In a further embodiment, the use of reclaimed synthetic turf material reduces the amount of traditional, often environmentally harmful materials that previously were sent to landfill, while still providing the same or similar level of product performance. Still further, substitution of virgin material with reclaimed synthetic turf material can reduce the manufacturing costs associated with producing various first generation products. Additionally, the incorporation of reclaimed synthetic turf material into a second generation product can also provide mechanical reinforcement or stability to the second generation product.

In some embodiments, the process of reclaiming a post use or post consumer synthetic turf begins at the point of installation. For a typical sports field, the synthetic turf is commonly installed by unrolling a roll of synthetic turf, such as, for example, a 15 foot wide by 150 foot long roll of turf. A field typically requires multiple rolls, which are laid out on the field side by side and seamed together to form the field. Once seamed together, infill is then installed. The compositions disclosed herein can be used as the infill. The infill may also be one or more conventional infills. When a synthetic turf is removed from a point of installation, typically at least a portion of the infill is separated from the turf. The infill may be removed prior to the removal of the turf, at the same time, or even after the turf has been removed. For example, a machine may collect the infill and place it into a container or onto the field. The turf and infill may be removed at the same time by a machine or by hand. However, this process is not perfect and some infill material will still be present.

After removal of the infill material, the face fibers of the synthetic turf material can optionally be sheared from the primary backing material. By first shearing the face fibers, it will be appreciated that a more substantially homogenous source of reclaimed turf material can be reclaimed and shipped for subsequent use or processing. As described above, the sheared face fibers will typically comprise polyethylene, polypropylene, nylon, or other materials singly or in combination. The remaining carcass material, comprised primarily of primary backing, precoat, filler, secondary backing, and residual face fibers can also be collected and shipped for subsequent recycling processes. The compositions disclosed herein can be made from a portion of the material in the recycling process. In another process, the entire synthetic turf material can be grinded to create a portion which corresponds to the composition disclosed herein.

ASPECTS

In view of the described compositions and articles and variations thereof, herein below are described certain more particularly described aspects of the inventions. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A composition comprising: a) from about 50 wt % to about 95 wt % of one or more performance infill materials; b) from about 3 wt % to about 25 wt % of one or more polymers; and c) from about 2 wt % to about 25 wt % of one or more combusted materials.

Aspect 2: The composition of aspect 1, wherein the composition comprises from about 60 wt % to about 95 wt % of the one or more performance infill materials.

Aspect 3: The composition of aspect 1, wherein the composition comprises from about 70 wt % to about 95 wt % of the one or more performance infill materials.

Aspect 4: The composition of aspect 1, wherein the composition comprises from about 80 wt % to about 95 wt % of the one or more performance infill materials.

Aspect 5: The composition of aspect 1, wherein the composition comprises from about 80 wt % to about 90 wt % of the one or more performance infill materials.

Aspect 6: The composition of aspect 1, wherein the composition comprises from about 85 wt % to about 90 wt % of the one or more performance infill materials.

Aspect 7: The composition of any one of aspects 1-6, wherein the composition comprises from about 5 wt % to about 25 wt % of the one or more polymers.

Aspect 8: The composition of any one of aspects 1-6, wherein the composition comprises from about 5 wt % to about 15 wt % of the one or more polymers.

Aspect 9: The composition of any one of aspects 1-6, wherein the composition comprises from about 5 wt % to about 10 wt % of the one or more polymers.

Aspect 10: The composition of any one of aspects 1-9, wherein the composition comprises from about 5 wt % to about 25 wt % of the one or more combusted materials.

Aspect 11: The composition of any one of aspects 1-9, wherein the composition comprises from about 5 wt % to about 15 wt % of the one or more combusted materials.

Aspect 12: The composition of any one of aspects 1-9, wherein the composition comprises from about 5 wt % to about 10 wt % of the one or more combusted materials.

Aspect 13: The composition of any one of aspects 1-12, wherein the composition comprises: a) from about 80 wt % to about 90 wt % of the one or more performance infill materials; b) from about 5 wt % to about 10 wt % of the one or more polymers; and c) from about 5 wt % to about 10 wt % of the one or more combusted materials.

Aspect 14: The composition of any one of aspects 1-13, wherein the one or more performance infill materials comprises one or more resilient infill materials or one or more non-resilient infill materials, or a combination thereof.

Aspect 15: The composition of aspect 14, wherein the one or more performance infill materials comprises the one or more resilient infill materials.

Aspect 16: The composition of aspect 15, wherein the one or more resilient infill materials are selected from the group consisting of crumb rubber, thermoplastic elastomer, thermoplastic polyurethane, ethylene propylene diene monomer rubber, neoprene, or a combination thereof.

Aspect 17: The composition of aspect 16, wherein the one or more resilient infill materials comprises crumb rubber.

Aspect 18: The composition of aspect 17, wherein the one or more performance infill materials comprises the one or more non-resilient infill materials.

Aspect 19: The composition of aspect 18, wherein the one or more non-resilient infill materials are selected from the group consisting of coconut husk, coconut fiber, walnut shell, and cork, or a combination thereof.

Aspect 20: The composition of any one of aspects 1-19, wherein the one or more polymers comprises one or more polyolefins.

Aspect 21: The composition of aspect 20, wherein the one or more polyolefins comprises polyethylene and polypropylene.

Aspect 22: The composition of aspect 21, wherein the composition comprises from about 3 wt % to about 14.9 wt % of polyethylene and from about 0.1 wt % to about 5 wt % of polypropylene.

Aspect 23: The composition of aspect 21, wherein the composition comprises from about 5 wt % to about 10 wt % of polyethylene and from about 0.5 wt % to about 1.5 wt % of polypropylene.

Aspect 24: The composition of any one of aspects 1-23, wherein the one or more polymers comprises one or more polyolefins, one or more polyesters, or one or more polyamides, or a combination thereof.

Aspect 25: The composition of aspect 24, wherein the one or more polymers comprises the one or more polyesters, wherein the one or more polyesters comprises polyethylene terephthalate.

Aspect 26: The composition of aspect 24, wherein the one or more polymers comprises the one or more polyamides, wherein the one or more polyamides comprises polyamide 6, polyamide 11, polyamide 12, or copolymers, or a blend thereof.

Aspect 27: The composition of any one of aspects 1-26, wherein the one or more combusted materials comprises ash.

Aspect 28: The composition of any one of aspects 1-27, wherein the composition comprises: a) from about 80 wt % to about 90 wt % of crumb rubber; b) about 5 wt % to about 10 wt % of polyethylene, from about 0.5 wt % to about 1.5 wt % of polypropylene; and c) from about 5 wt % to about 10 wt % of ash.

Aspect 29: A composition comprising: a) from about more than 0 wt % to 100 wt % of the composition of any one of aspects 1-28; and b) about less than 100 wt % to 0 wt % of one or more performance infill materials.

Aspect 30: The composition of aspect 29, wherein the composition comprises from about more than 0 wt % to 100 wt % of the one or more performance infill materials.

Aspect 31: The composition of aspect 29, wherein the composition comprises: a) from about 5 wt % to less than 100 wt % of the composition of any one of aspects 1-28; and b) from about 95 wt % to about more than 0 wt % of the one or more performance infill materials.

Aspect 32: The composition of aspect 29, wherein the composition comprises: a) from about 10 wt % to less than 100 wt % of the composition of any one of aspects 1-28; and b) from about 90 wt % to about more than 0 wt % o of the one or more performance infill materials.

Aspect 33: The composition of aspect 29, wherein the composition comprises: a) from about 20 wt % to less than 100 wt % of the composition of any one of aspects 1-28; and b) from about 80 wt % to about more than 0 wt % of the one or more performance infill materials.

Aspect 34: The composition of aspect 29, wherein the composition comprises: a) from about 30 wt % to less than 100 wt % of the composition of any one of aspects 1-28; and b) from about 70 wt % to about more than 0 wt % of the one or more performance infill materials.

Aspect 35: The composition of aspect 29, wherein the composition comprises: a) from about 40 wt % to less than 100 wt % of the composition of any one of aspects 1-28; and b) from about 60 wt % to about more than 0 wt % of the one or more performance infill materials.

Aspect 36: The composition of aspect 29, wherein the composition comprises: a) from about 50 wt % to less than 100 wt % of the composition of any one of aspects 1-28; and b) from about 50 wt % to about more than 0 wt % of the one or more performance infill materials.

Aspect 37: The composition of aspect 29, wherein the composition comprises: a) from about 60 wt % to less than 100 wt % of the composition of any one of aspects 1-28; and b) from about 40 wt % to about more than 0 wt % of the one or more performance infill materials.

Aspect 38: The composition of aspect 29, wherein the composition comprises: a) from about 70 wt % to less than 100 wt % of the composition of any one of aspects 1-28; and b) from about 30 wt % to about more than 0 wt % of the one or more performance infill materials.

Aspect 39: The composition of aspect 29, wherein the composition comprises: a) from about 80 wt % to less than 100 wt % of the composition of any one of aspects 1-28; and b) from about 20 wt % to about more than 0 wt % of the one or more performance infill materials.

Aspect 40: The composition of aspect 29, wherein the composition comprises: a) from about 90 wt % to less than 100 wt % of the composition of any one of aspects 1-28; and b) from about 10 wt % to about more than 0 wt % of the one or more performance infill materials.

Aspect 41: The composition of aspect 29, wherein the composition comprises: a) from about 95 wt % to less than 100 wt % of the composition of any one of aspects 1-28; and b) from about 5 wt % to about more than 0 wt % of the one or more performance infill materials.

Aspect 42: The composition of aspect 29, wherein the composition comprises: a) from about more than 0 wt % to about 95 wt % of the composition of any one of aspects 1-28; and b) from about less than 100 wt % to about 5 wt % of the one or more performance infill materials.

Aspect 43: The composition of aspect 29, wherein the composition comprises: a) from about more than 0 wt % to about 90 wt % of the composition of any one of aspects 1-28; and b) from about less than 100 wt % to about 10 wt % of the one or more performance infill materials.

Aspect 44: The composition of aspect 29, wherein the composition comprises: a) from about more than 0 wt % to about 80 wt % of the composition of any one of aspects 1-28; and b) from about less than 100 wt % to about 20 wt % of the one or more performance infill materials.

Aspect 45: The composition of aspect 29, wherein the composition comprises: a) from about more than 0 wt % to about 70 wt % of the composition of any one of aspects 1-28; and b) from about less than 100 wt % to about 30 wt % of the one or more performance infill materials.

Aspect 46: The composition of aspect 29, wherein the composition comprises: a) from about more than 0 wt % to about 60 wt % of the composition of any one of aspects 1-28; and b) from about less than 100 wt % to about 40 wt % of the one or more performance infill materials.

Aspect 47: The composition of aspect 29, wherein the composition comprises: a) from about more than 0 wt % to about 50 wt % of the composition of any one of aspects 1-28; and b) from about less than 100 wt % to about 50 wt % of the one or more performance infill materials.

Aspect 48: The composition of aspect 29, wherein the composition comprises: a) from about more than 0 wt % to about 40 wt % of the composition of any one of aspects 1-28; and b) from about less than 100 wt % to about 60 wt % of the one or more performance infill materials.

Aspect 49: The composition of aspect 29, wherein the composition comprises: a) from about more than 0 wt % to about 30 wt % of the composition of any one of aspects 1-28; and b) from about less than 100 wt % to about 70 wt % of the one or more performance infill materials.

Aspect 50: The composition of aspect 29, wherein the composition comprises: a) from about more than 0 wt % to about 20 wt % of the composition of any one of aspects 1-28; and b) from about less than 100 wt % to about 80 wt % of the one or more performance infill materials.

Aspect 51: The composition of aspect 29, wherein the composition comprises: a) from about more than 0 wt % to about 10 wt % of the composition of any one of aspects 1-28; and b) from about less than 100 wt % to about 90 wt % of the one or more performance infill materials.

Aspect 52: The composition of aspect 29, wherein the composition comprises: a) from about more than 0 wt % to about 5 wt % of the composition of any one of aspects 1-28; and b) from about less than 100 wt % to about 95 wt % of the one or more performance infill materials.

Aspect 53: The composition of aspect 29, wherein the composition comprises: a) from about 5 wt % to about 95 wt % of the composition of any one of aspects 1-28; and b) from about 95 wt % to about 5 wt % of the one or more performance infill materials.

Aspect 54: The composition of aspect 29, wherein the composition comprises: a) from about 10 wt % to about 90 wt % of the composition of any one of aspects 1-28; and b) from about 90 wt % to about 10 wt % of the one or more performance infill materials.

Aspect 55: The composition of aspect 29, wherein the composition comprises: a) from about 20 wt % to about 80 wt % of the composition of any one of aspects 1-28; and b) from about 80 wt % to about 20 wt % of the one or more performance infill materials.

Aspect 56: The composition of aspect 29, wherein the composition comprises: a) from about 30 wt % to about 70 wt % of the composition of any one of aspects 1-28; and b) from about 70 wt % to about 30 wt % of the one or more performance infill materials.

Aspect 57: The composition of aspect 29, wherein the composition comprises: a) from about 40 wt % to about 60 wt % of the composition of any one of aspects 1-28; and b) from about 60 wt % to about 40 wt % of the one or more performance infill materials.

Aspect 58: The composition of aspect 29, wherein the composition comprises: a) from about 45 wt % to about 55 wt % of the composition of any one of aspects 1-28; and b) from about 55 wt % to about 45 wt % of the one or more performance infill materials.

Aspect 59: The composition of aspect 29, wherein the one or more performance infill materials comprises one or more resilient infill materials or one or more non-resilient infill materials, or a combination thereof.

Aspect 60: The composition of any one of aspects 29-59, wherein the one or more performance infill materials comprises the one or more resilient infill materials.

Aspect 61: The composition of aspect 60, wherein the one or more resilient infill materials are selected from the group consisting of crumb rubber, thermoplastic elastomer, and ethylene propylene diene monomer rubber, or a combination thereof.

Aspect 62: The composition of aspect 61, wherein the one or more resilient infill materials comprises crumb rubber.

Aspect 63: The composition of aspect 59, wherein the one or more performance infill materials comprises the one or more non-resilient infill materials.

Aspect 64: The composition of aspect 63, wherein the one or more non-resilient infill materials are selected from the group consisting of coconut husk, coconut fiber, walnut shell, and cork, or a combination thereof.

Aspect 65: A synthetic turf installation comprising a primary backing having a face side and a backside, a plurality of yarns tufted into the primary backing and extending substantially vertically away from the face side thereof and infill disposed between the yarns, wherein the infill comprises the composition of any one of aspects 29-64.

EXAMPLES

The following examples are put forth so as to provide those of ordinary skill in the art with a complete disclosure and description of how the compounds, compositions, articles, devices, and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

An non-limiting exemplary composition disclosed herein is described in this example. Used synthetic turf was reclaimed. A portion of the reclaimed synthetic turf was recycled. Another portion, which was not recycled, was analyzed for its components. The synthetic turf that was reclaimed contained crumb rubber as the infill material. The components in the analyzed portion, a non-limiting exemplary composition disclosed herein, was found to be mostly crumb rubber and synthetic grass fibers fragments. The ash content of the material was determined prior to further processing. The ash content of the material was determined to be 6.2 wt %. Differential scanning calorimetri (DSC) was used to determine the content of the material, i.e. non-limiting exemplary composition, in addition to the ash content. The material was separated prior to analysis by density of water. The separated portions, floaters and sinkers, were analyzed separately. The material contained 91.2 wt % of sinkers and 8.8 wt % of floaters. The materials was cryomilled to make it homogeneous and standard DSC, ash and moisture analyses were performed.

The sinkers mostly contained crumb rubber and did not give any peaks or transitions in the DCS, which indicates that no meltable polymer was present. This is to be expected of a thermoset polymer, such as crumb rubber. The floaters showed melting points indicative of polypropylene and polyethylene, and the ratio of the polypropylene to polyethylene was calculated.

The analysis of the material is shown below in Table 1.

TABLE 1

| Component in Material | Content in wt % |
|---|---|
| Crumb rubber | 86.2 wt % |
| Polyethylene | 7.5 wt % |
| Polypropylene | 0.9 wt % |
| Ash | 6.2 wt % |
| Moisture | 0.3 wt % |
| | Total content = 101.1 wt % |

The total content of the material is above 100 wt %, because the ash and moisture content were determined prior to separating the material into sinkers and floaters, and that the components of the sinker and floaters were calculated from the ash and moisture content of the sinkers and floaters respectively. Thus, there is some margin of error in the calculations. However, the content of the components of the material can be understood from these results.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the preferred forms of the invention have been disclosed, it will be apparent to those skilled in the art that various changes and modifications may be made that will achieve some of the advantages of the invention without departing from the spirit and scope of the invention. Therefore, the scope of the invention is to be determined solely by the claims to be appended.

What is claimed is:

1. A composition comprising:

a. from about 80 wt % to about 95 wt % of:

i. one or more performance infill materials being one or more resilient infill materials selected from the group consisting of crumb rubber, thermoplastic elastomer, thermoplastic polyurethane, neoprene, and ethylene propylene diene monomer rubber; or ii. one or more non-resilient infill materials selected from the group consisting of coconut husk, coconut fiber, walnut shell, and cork; or iii. a combination of i. and ii.;

b. in addition to a., from about 3 wt % to about 10 wt % of one or more polymers being polypropylene, polyethylene, or a combination thereof; and c. from about 2 wt % to about 10 wt % of one or more combusted materials, wherein the composition is a homogeneous composition, wherein the composition is a particle having a size from 10 mesh to 30 mesh.

2. The composition of claim 1, wherein the composition comprises from about 80 wt % to about 90 wt % of the one or more performance infill materials.

3. The composition of claim 1, wherein the composition comprises from about 5 wt % to about 10 wt % of the one or more polymers being polypropylene, polyethylene, or a combination thereof.

4. The composition of claim 1, wherein the composition comprises from about 5 wt % to about 10 wt % of the one or more combusted materials.

5. The composition of claim 1, wherein the composition comprises:

a. from about 80 wt % to about 90 wt % of the one or more performance infill materials;

b. from about 5 wt % to about 10 wt % of the one or more polymers being polypropylene, polyethylene, or a combination thereof; and c. from about 5 wt % to about 10 wt % of the one or more combusted materials.

6. The composition of claim 1, wherein the one or more resilient infill materials comprises crumb rubber.

7. The composition of claim 1, wherein component b. is from about 3 wt % to about 9.914.9 wt % of polyethylene and from about 0.1 wt % to about 5 wt % of polypropylene.

8. The composition of claim 1, wherein component b. is from about 5 wt % to about 9.5 wt % of polyethylene and from about 0.5 wt % to about 1.5 wt % of polypropylene.

9. The composition of claim 1, wherein the one or more combusted materials comprises ash.

10. The composition of claim 1, wherein the composition comprises:

a. from about 80 wt % to about 90 wt % of crumb rubber;

b. about 5 wt % to about 9.5 wt % of polyethylene, from about 0.5 wt % to about 1.5 wt % of polypropylene; and c. from about 5 wt % to about 10 wt % of ash.

11. A composition comprising:

a. from about more than 10 wt % to 90 wt % of the composition of claim 1; and b. about less than 90 wt % to 10 wt % of one or more additional performance infill materials being one or more resilient infill materials selected from the group consisting of crumb rubber, thermoplastic elastomer, thermoplastic polyurethane, neoprene, and ethylene propylene diene monomer rubber; or one or more non-resilient infill materials selected from the group consisting of coconut husk, coconut fiber, walnut shell, and cork; or a combination thereof.

12. The composition of claim 11, wherein the composition comprises:

a. from about 30 wt % to less than 100 wt % of the composition of claim 1; and b. from about 70 wt % to about more than 0 wt % of the one or more additional performance infill materials.

13. The composition of claim 11, wherein the composition comprises:

a. from about 50 wt % to less than 100 wt % of the composition of claim 1; and b. from about 50 wt % to about more than 0 wt % of the one or more additional performance infill materials.

14. The composition of claim 11, wherein the composition comprises:

a. from about 70 wt % to less than 100 wt % of the composition of claim 1; and b. from about 30 wt % to about more than 0 wt % of the one or more additional performance infill materials.

15. A synthetic turf installation comprising a primary backing having a face side and a backside, a plurality of yarns tufted into the primary backing and extending substantially vertically away from the face side thereof and infill disposed between the yarns, wherein the infill comprises the composition of claim 11.

16. The composition of claim 1, wherein the composition comprises from about 85 wt % to about 90 wt % of component a.

* * * * *